United States Patent Office 3,507,606
Patented Apr. 21, 1970

3,507,606
ACYLPHENYLAMINOANTHRAQUINONE DYES FOR LINEAR POLYESTER MATERIALS
John David Hildreth, Bramhall, England, and Joseph William Fitzpatrick, Pine Beach, Karl Heinz Lohmann, Toms River, Arthur David Olin, Lakewood, and Beno Schmidhalter, Toms River, N.J., assignors to Toms River Chemical Corporation, Toms River, N.J., a corporation of Delaware
No Drawing. Filed Sept. 27, 1966, Ser. No. 582,222
Int. Cl. C09b 1/00, 5/62
U.S. Cl. 8—39
8 Claims

ABSTRACT OF THE DISCLOSURE

Acylphenylaminoanthraquinones of the formula

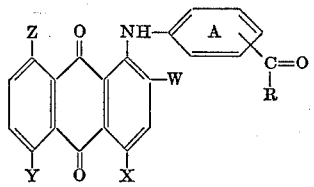

in which R is hydrogen, alkyl of 1 to 9 carbon atoms, halo- or hydroxy-lower alkyl or phenyl, including substituted phenyl in which the substituents can be halogen, such as chlorine or bromine, hydroxy, lower alkyl and lower alkoxy, the phenyl ring A can be substituted by halogen, hydroxy, lower alkyl or lower alkoxy, W is alkyl, particularly lower alkyl, such as methyl, lower alkoxy, such as methoxy, halogen or hydrogen, and wherein the substituents X, Y and Z can be independently selected from hydrogen or hydroxy, that is, any or all of X, Y and Z can be hydrogen or hydroxy, or any one of the substituents X, Y and Z can be

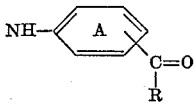

benzamido, p-toluenesulfonamido, benzenesulfonamido, hydroxy, amino or lower alkoxy and the remaining substituents are hydrogen; or wherein X can be hydroxy and Y and Z are chlorine or one of Y and Z is hydroxy and the other is nitro, or

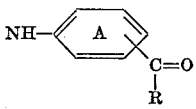

or wherein X is methoxy and one of Y or Z is methoxy and the other is

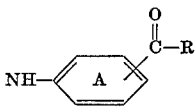

where R has the meaning given above, the phenyl ring, A, can be substituted by halogen, hydroxy, lower alkyl or lower alkoxy; and with the proviso that only one of X, Y or Z can be the group

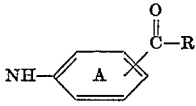

are valuable dyestuffs for polyester fibers particularly suited for application by the thermofixation method and having good fastness to light and to sublimation.

In accordance with the present invention, it has been discovered that valuable dyeings and printings are produced on fibrous materials of aromatic polyesters, especially polyethylene terephthalate, by using as dyestuffs acylphenylaminoanthraquinones of the formula

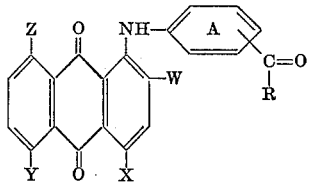

in which R is hydrogen, alkyl of 1 to 9 carbon atoms, halo- or hydroxy-lower alkyl or phenyl, including substituted phenyl in which the substituents can be halogen, such as chlorine or bromine, hydroxy, lower alkyl and lower alkoxy, the phenyl ring A can be substituted by halogen, hydroxy, lower alkyl or lower alkoxy, W is alkyl, particularly lower alkyl, such as methyl, lower alkoxy, such as methoxy, halogen or hydrogen, and wherein the substituents X, Y and Z can be independently selected from hydrogen or hydroxy, that is, any or all of X, Y and Z can be hydrogen or hydroxy, or any one of the substituents X, Y and Z can be

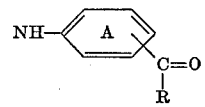

benzamido, p-toluenesulfonamido, benzenesulfonamido, hydroxy, amino or lower alkoxy and the remaining substituents are hydrogen; or wherein X can be hydroxy and Y and Z are chlorine or one of Y and Z is hydroxy and the other is nitro, or

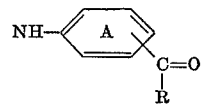

or wherein X is methoxy and one of Y or Z is methoxy and the other is

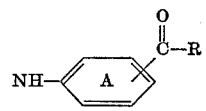

where R has the meaning given above, the phenyl ring, A, can be substituted by halogen, hydroxy, lower alkyl or lower alkoxy; and with the proviso that only one of X, Y or Z can be the group

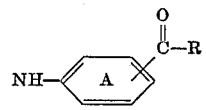

Many of the acylphenylaminoanthraquinones disclosed herein for use of dyestuffs for polyester fibrous materials are novel compounds and the preparation and use of these novel compounds are specifically disclosed herein. More particularly, the acylphenylaminoanthraquinones of the formula

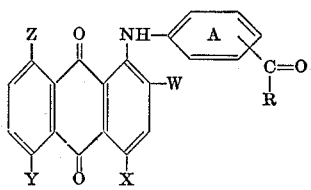

in which R is hydrogen, alkyl of 2 to 9 carbon atoms, such as ethyl, propyl or butyl, halo- or hydroxy-lower alkyl and substituted phenyl in which the substituents can be halogen, such as chlorine or bromine, hydroxy and lower alkoxy, the phenyl ring A can be substituted by halogen, hydroxy, lower alkyl or lower alkoxy, W is alkyl, particularly lower alkyl, lower alkoxy such as methoxy, halogen or hydrogen, and wherein the substituents X, Y and Z can be independently selected from hydrogen or hydroxy or any one of the substituents X, Y and Z can be

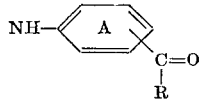

benzamido, p-toluenesulfonamido, benzenesulfonamido, hydroxy, amino or lower alkoxy and the remaining substituents are hydrogen; or wherein X can be hydroxy and Y and Z are chlorine or one of Y and Z is hydroxy and the other is nitro,

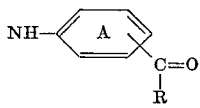

or wherein X is methoxy and one of Y or Z is methoxy and the other is

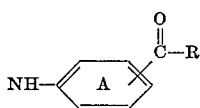

where R has the meaning given above, the phenyl ring, A, can be substituted by halogen, hydroxy, lower alkyl or lower alkoxy; and with the proviso that only one of X, Y or Z can be the group

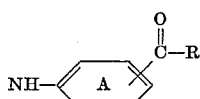

Among the compounds of interest as dyestuffs for polyester fibrous materials, the following are of particular interest:

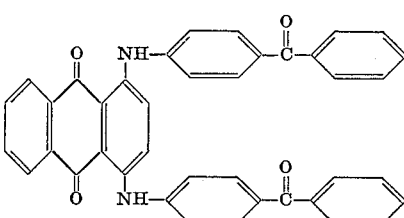

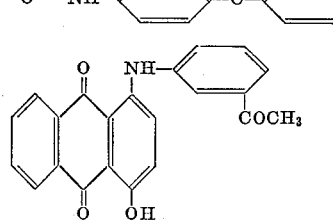

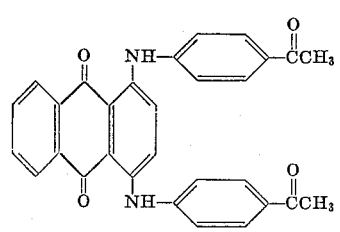

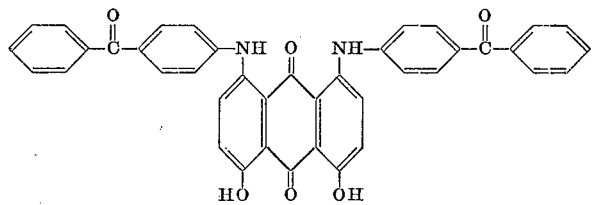

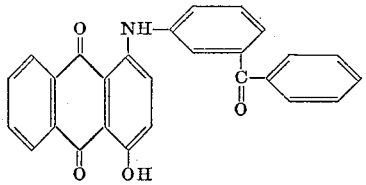

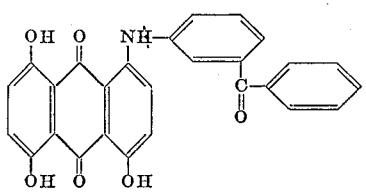

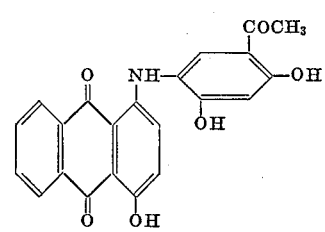

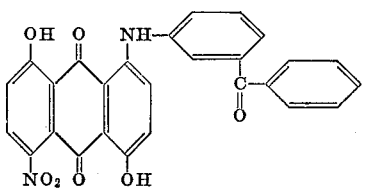

Of the above dyestusffs, the last four are new compounds.

The acylphenylaminoanthraquinones employed according to the present invention are obtained as follows:

(a) An anthraquinone derivative containing at least one primary amino group is reacted with a halogenated compound such as p-chlorobenzaldehyde, p-bromobenzaldehyde, p - chloroacetophenone, p - bromoacetophenone, p-chlorobenzophenone, p-bromobenzophenone or p-chloropropiophenone. The analogous o- and m-halogenated compounds can also be employed. Suitably, the reaction is carried out in an inert solvent, such as nitrobenzene, and in the presence of a copper catalyst, such as cuprous chloride, and an acid acceptor, such as potassium acetate.

(b) A chloroanthraquinone, is reacted with a meta- or para-aminophenylketone, such as meta- or para-aminoacetophenone. Illustratively, the chloroanthraquinone can be 1-chloroanthraquinone, 1-4-dichloroanthraquinone, 1,5-dichloro-4,8 - dihydroxy anthraquinone, 1 - methylamino-4-bromoanthraquinone or 1 - amino - 2 - dibromoanthraquinone.

(c) A mixture of quinizarin, leucoquinizarin and boric acid is heated with a meta- or para-aminophenylketone, such as meta- or para-aminoacetophenone in an alcohol solvent, such as ethyl alcohol, n-butyl alcohol or amyl alcohol.

(d) A meta- or para-aminophenylketone is condensed with dinitrochrysazin or dinitroanthrarufin in a suitable solvent, such as nitrobenzene, methylcellosolve, ethylcellosolve or amyl alcohol.

(e) A mixture of leuco-1,4,5,8-tetrahydroxyanthraquinone and boric acid is heated with a meta- or para-aminophenylketone, such as meta- or para-aminoacetophenone in an alcohol solvent, such as n-butyl alcohol or amyl alcohol.

For dyeing, the said dyestuffs are preferably used in a finely divided form and the dyeing is carried out in the presence of a dispersing agent, such as sulphite cellulose waste liquor or a synthetic detergent, or a combination of different wetting and dispersing agents. Before dyeing, it is generally of advantage to convert the dyestuff or dyestuffs to be used into a dyestuff preparation which contains a dispersing agent and the finely divided dyestuff(s) in such a form as to yield a fine dispersion when the preparation is diluted with water. Dyestuff preparations of this kind can be made by known methods, for example, by grinding the dyestuff(s) either in dry or wet form with or without the addition of a dispersing agent.

The dyestuffs used in the invention are especially suitable for dyeing by the so-called thermofixation or Pad/Thermofix method, in which the fabric to be dyed is impregnated advantageously at a temperature not exceeding 60° C. with an aqueous dispersion of the dyestuff, which may contain 1 to 50% of urea and a thickening agent, especially sodium alginate, and the fabric is squeezed in the usual manner. The squeezing is preferably carried out so that the goods retain 50 to 100% of their weight of dye liquor.

The dyestuff is fixed by subjecting the impregnated fabric to a heat treatment at temperatures above 100° C., for example, at a temperature ranging from 120-220° C., it being of advantage to dry the fabric prior to this treatment, for example, in a current of warm air.

The thermofixation mentioned above is of special interest for the dyeing of mixed fabrics of polyester fibers and cellulose fibers, especially cotton. In this case, in addition to the dyestuff to be used in the process of the invention, the padding liquor contains a dyestuff suitable for dyeing cotton, for example, a direct dyestuff or vat dyestuff, or a so-called reactive dyestuff, i.e. a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used, the padded fabric must be treated, after the heat treatment, with an aqueous alkaline solution of a reducing agent of the kind used in vat dyeing.

The dyeings produced on polyester fibers by the process of the invention are advantageously given an after-treatment, for example, by heating them with an aqueous solution of a non-ionic detergent.

Instead of applying the dyestuffs in the process by impregnation, they may be applied by printing. For this purpose, a printing color is used which, in addition to the usual printing assistants, such as wetting and thickening agents, contains the finely dispersed dyestuff, if desired, in admixture with one of the aforesaid cotton dyestuffs, and, if desired, in the presence of urea and/or an agent capable of binding acid.

There are obtained by the practice of the present invention strong dyeings or prints of attractive shade and good color build-up having excellent fastness properties, especially a good fastness to sublimation and to light. The introduction of permanent crease fabrics has lent still further emphasis to the importance of sublimation fastness since the processes involved in the preparation of such fabrics requires the curing at elevated temperatures for prolonged periods of the resin finishes applied for the achievement of permanent crease characteristics. The light fastness properties of the dyes employed according to the present invention are particularly important since many of these dyes provide dyeings in the blue to green shade range wherein good light fastness has always been difficult to achieve. Another advantage resides in the fact that the dyestuffs employed in the present invention are produced more economically than available commercial violet dyestuffs of similar fastness properties.

The term polyester defines synthetic polymeric polyesters, such as the highly polymeric linear polyesters, the molecules of which have recurring monomeric units connected by ester linkages. Dibasic acids, for example, aromatic acids, such as terephthalic acid, diphenyl-4,4'-dicarboxylic acid and/or diphenyl-sulfone - 4,4' - dicarboxylic acid and dihydroxy compounds, for example, glycols, such as ethylene glycol, diethylene glycol, triethylene glycol, propylene glycol and/or butylene glycol, as well as other diols, such as 1,4-cyclohexyldiol can be used as the monomers to form the polymeric polyesters. Typical commercial examples of such fibers are Dacron, Terylene, Fortrel, Trevira, Terlanca, Kodel, Vycron, etc. They are disclosed, for example, in U.S. Patent No. 2,901,466 and British Patents Nos. 578,079, 579,462, 588,497, and 596,688.

The present invention is, of course, equally applicable to the dyeing of blends of polyester fibers and cellulosic fibers. The latter term includes native cellulose, such as linen or, more particularly, cotton, as well as regenerated cellulose, such as viscose of cuprammonium rayon.

The following examples illustrate the invention, the parts and percentages being by weight unless otherwise specified.

EXAMPLE 1

60 parts of 1,4-diaminoanthraquinone, 150 parts of 4-bromobenzophenone, 100 parts of potassium acetate, 5 parts of cuprous chloride and 1400 parts of nitrobenzene are stirred and heated for 5 hours at 198–206° C. The mixture is cooled to 25–30° C., and the precipitated product is recovered by filtration. The product is washed with nitrobenzene and the nitrobenzene is then removed by steam distillation. Undissolved copper is solubilized by adding hydrochloric acid and the product is again recovered by filtration.

The product, obtained as a presscake is 1,4-bis-p-benzoyl-anilinoanthraquinone. The presscake is converted to an aqueous paste by milling it with sodium lignin sulfonate. This paste dyes polyester fabrics by the Thermosol process a bright, deep green shade with excellent sublimation fastness and good light fastness.

Following the procedure described hereinbefore and using the intermediates indicated hereinafter in Table I, the following compounds and shades on polyester fabrics are obtained. All of these dyeings exhibit good to excellent sublimation and light fastness.

TABLE I

| Aminoanthraquinone | Halophenylketone | Anthraquinone product | Shade on polyester |
|---|---|---|---|
| 1-amino- | 4-bromobenzophenone | 1-(4-benzoylphenylamino)anthraquinone | Pink. |
| 1,5-diamino- | 4-bromobenzophenone | 1,5-bis(4-benzoylphenylamino)anthraquinone | Bluish Red. |
| 1-amino-4-hydroxy | 4-bromobenzophenone | 1-(4-benzoylphenylamino)-4-hydroxyanthraquinone | Violet. |
| 1-amino-4-hydroxy-2-bromo | 4-bromobenzophenone | 1-(4-benzoylphenylamino)-2-bromo-4-hydroxyanthraquinone | Violet. |
| 1-amino-2-methyl- | 3-bromobenzophenone | 1-(3-benzoylphenylamino)-2-methylanthraquinone | Red. |
| 1,5-diamino- | 4′-bromoacetophenone | 1,5-bis(4-acetylphenylamino)anthraquinone | Bluish Red. |
| 1-amino-5-benzamido- | 4′-bromo-acetophenone | 1-(4-acetylphenylamino)-5-benzamidoanthraquinone | Pink. |
| 1-amino-2,4-dimethoxy | 4′-bromo-acetophenone | 1-(4-acetylphenylamino)-2,4-dimethoxyanthraquinone | Bluish Red. |

TABLE I.—Continued

| Aminoanthraquinone | Halophenylketone | Anthraquinone product | Shade on polyester |
|---|---|---|---|
| 1-amino-8-benzamido- | 4'-bromo-acetophenone. | | Pink. |
| 1-amino-2-methyl-4-p-toluene-sulfonamido-. | 3'-bromo-acetophenone. | | Violet. |
| 1,8-diamino | 3'-bromo-acetophenone. | | Bluish Red. |
| 1-amino-5-p-toluene-sulfonamido. | 4'-bromo-propiophenone. | | Red. |
| 1-amino-4-ethoxy- | 4'-bromo-3'-methyl-propiophenone. | | Violet. |
| 1-amino-5-benzene-sulfonamido-. | 4'-bromo-heptanophenone. | | Red. |

EXAMPLE 2

34 parts of 1-amino-4-benzamidoanthraquinone, 39 parts of sodium carbonate, 2 parts of cuprous chloride, 1 part copper acetate, 20 parts of 2-chlorobenzaldehyde and 250 parts of naphthalene are heated and stirred 24 hours at 208° to 210° C. The mixture is cooled to 125° C. and 275 parts of monochlorobenzene is then added. The mixture is further cooled to 50° C. and the product is recovered by filtration and washed with 150 parts of monochlorobenzene. The presscake is steam distilled, treated with hydrochloric acid and converted to an aqueous paste as described in Example 1. The dyestuff obtained, 1-benzamido-4-o-formylanilinoanthraquinone, applied to polyester fabrics by the Thermosol process, produces a violet shade with excellent light and sublimation fastness.

Following the procedure described hereinbefore and using the intermediates indicated hereinafter, the following compounds and shades on polyester fabrics are obtained. All of these dyeings exhibit excellent sublimation fastness and good-to-excellent light fastness.

TABLE II

| AMINO-ANTHRAQUINONE | HALOPHENYL-KETONE OR HALOBENZALDE-HYDE | ANTHRAQUINONE PRODUCT | SHADE ON POLY-ESTER |
|---|---|---|---|
| 1-amino-4-hydroxy | 2-chloro-benzaldehyde | (1-NH-(2-CHO-phenyl)-4-hydroxyanthraquinone) | Violet. |
| 1,4-diamino | 4-bromo-benzaldehyde | (1,4-bis(4-CHO-phenylamino)anthraquinone) | Green. |
| 1-amino-4-benzamido | 4'-chloro-acetophenone | (1-(4-acetylphenylamino)-4-benzamidoanthraquinone) | Reddish Blue. |
| 1,4-diamino | 4'-chloro-acetophenone | (1,4-bis(4-acetylphenylamino)anthraquinone) | Green. |
| 1-amino-4-benzamido | 2'-bromo-4'-methoxyaceto-phenone | (1-(2-acetyl-4-methoxyphenylamino)-4-benzamidoanthraquinone) | Reddish Blue. |
| 1-amino-4-benzamido | 5'-bromo-2'-hydroxy-acetophenone | (1-(2-acetyl-4-hydroxyphenylamino)-4-benzamidoanthraquinone) | Reddish Blue. |
| 1-amino- | 2-bromo-benzophenone | (1-(2-benzoylphenylamino)anthraquinone) | Red. |

TABLE II.—Continued

| AMINO-ANTHRAQUINONE | HALOPHENYL-KETONE OR HALOBENZALDE-HYDE | ANTHRAQUINONE PRODUCT | SHADE ON POLYESTER |
|---|---|---|---|
| 1-amino-4-hydroxy- | 5-chloro-2-hydroxy-benzophenone. | (structure) | Reddish Blue. |
| 1,8-diamino-4,5-dihydroxy-. | 4-bromo-benzophenone. | (structure) | Bluish Green. |
| 1,5-diamino-4,8-dimethoxy-. | 4'-bromo-propiophenone. | (structure) | Bluish Green. |
| 1-amino-4-benzamido | 4'-chloro-2-methyl-propiophenone. | (structure) | Reddish Blue. |

EXAMPLE 3

13.5 parts of 3'-aminoacetophenone, 5.5 parts of potassium acetate, 0.25 part of copper sulfate, 0.20 part of copper acetate, 2.0 parts of cuprous chloride, 12.6 parts of 1-methylamino-4-bromoanthraquinone and 50 parts of monochlorobenzene are heated and stirred 24 hours at 125° to 130° C. The reaction mixture is cooled to 25°, filtered and washed with 100 parts of monochlorobenzene. The presscake is steam distilled, treated with hydrochloric acid and converted to an aqueous paste as described in Example 1. The dyestuff obtained, 1-methylamino-4-m-acetylanilinoanthraquinone, dyes polyester fabrics a blue shade with good sublimation fastness.

EXAMPLE 4

125.0 parts of 95% ethyl alcohol and 10.0 parts of anhydrous boric acid are heated together to reflux, with stirring, to dissolve the boric acid. 5.0 parts of leucoquinizarin, 13.5 parts of quinizarin, and 17.0 parts of 3'-aminobenzophenone are added to the reaction mixture. The reaction mixture is then refluxed, with stirring, for 16 hours; the mixture is then cooled to 25–30° C. and filtered. The product on the filter is washed 3 times with 25.0 parts of 95% ethyl alcohol and then with hot water followed by drying. 1-hydroxy-4-m-benzoylanilinoanthraquinone is obtained as a dark, violet powder in a yield of 27.0 parts. When used in dyeing, it gives violet dyeings having excellent light and sublimation fastness on polyester fibers.

Following the procedure described hereinbefore and reacting a mixture of leucoquinizarin and quinizarin with the aminophenylketones indicated hereinafter, the following compounds and shades on polyester fabrics are obtained. All of these dyeings exhibit excellent light fastness.

TABLE III

| Aminophenylketone | Anthraquinone product | Shade on polyester |
|---|---|---|
| 3'-aminoacetophenone | 1-amino-4-hydroxy-anthraquinone with NH-phenyl-C(=O)-CH₃ substituent | Violet. |
| 3'-amino-4'-ethyl-acetophenone | corresponding anthraquinone with NH-(4-ethylphenyl)-C(=O)-CH₃ | Violet. |
| 3'-amino-4'-methoxy-propiophenone | corresponding anthraquinone with NH-(4-methoxyphenyl)-C(=O)-CH₂-CH₃ | Violet. |

EXAMPLE 5

125.0 parts of primary amyl alcohol and 5.0 parts of anhydrous boric acid are heated together to reflux, with stirring, to dissolve the boric acid.

5.0 parts of leucoquinizarin, 13.5 parts of quinizarin and 16.0 parts of p-aminobenzophenone are added to the reaction mixture.

The reaction mixture is then refluxed (132–134° C.), with stirring, for 15 hours. The mixture is cooled to room temperature and filtered.

The filtered product is washed three times with 25 parts of primary amyl alcohol. The presscake is steam distilled and converted to an aqueous paste as described in Example 1.

The product, 1-hydroxy - 4 - p-benzolanilinoanthraquinone, gives violet dyeings on polyester fiber, possessing excellent fastness properties.

Following the procedure described hereinbefore and reacting a mixture of leucoquinizarin with the aminophenylketones indicated hereinafter, the following compounds and shades on polyester fabrics are obtained. All of these dyeings exhibit excellent light and sublimation fastness.

TABLE IV

| Aminophenylketone | Anthraquinone product | Shade on polyester |
|---|---|---|
| 5-amino-2-chloro-benzophenone | 1-hydroxy-4-(2-chloro-5-benzoylanilino)-anthraquinone | Reddish Violet. |
| 4-amino-4'-methoxy-benzophenone | 1-hydroxy-4-(4-(4-methoxybenzoyl)anilino)-anthraquinone | Violet. |
| 4-amino-2'-chloro-2-methylbenzo-phenone | 1-hydroxy-4-(2-methyl-4-(2-chlorobenzoyl)anilino)-anthraquinone | Violet. |

TABLE IV—Continued

| Aminophenylketone | Anthraquinone product | Shade on polyester |
|---|---|---|
| 4-amino-4'-methyl-benzophenone | 1-hydroxy-4-(4-(4-methylbenzoyl)anilino)anthraquinone structure with NH—C6H4—CO—C6H4—CH3 | Violet. |
| 4'-amino-2-hydroxy-acetophenone | structure with NH—C6H4—COCH2OH | Violet. |
| 3'-amino-4'-methoxy-acetophenone | structure with NH—C6H3(COCH3)(OCH3) | Reddish Blue. |
| 3'-amino-4'-bromo-acetophenone | structure with NH—C6H3(COCH3)(Br) | Violet. |
| 5'-amino-2',4'-dihydroxyacetophenone | structure with NH—C6H2(COCH3)(OH)(OH) | Blue. |
| 4'-amino-hexanophenone | structure with NH—C6H4—CO(CH2)4CH3 | Violet. |
| 4'-amino-decanophenone | structure with NH—C6H4—CO(CH2)8CH3 | Violet. |

EXAMPLE 6

160.0 parts of 95% ethyl alcohol and 30.0 parts of anhydrous boric acid are heated together to reflux, with stirring, to dissolve the boric acid. 16.0 parts of leuco-quinizarin, 37.0 parts of 5,8-dichloroquinizarin, and 28.0 parts of 3'-aminoacetophenone are added to the reaction mixture. The reaction mixture is then refluxed, with stirring, for 24–30 hours, 80.0 parts of ethyl alcohol is then added and the mixture is cooled and filtered. The filtered product is washed with 2×50.0 parts of ethyl alcohol then with hot water followed by drying. The product, consisting essentially of a mixture of 1-hydroxy-4-m-acetylanilino-5,8-dichloroanthraquinone and 1 - hydroxy-4-m-acetylanilinoanthraquinone, is obtained as a dark powder in a yield of 69.0 parts. The product dyed polyester fibers in reddish blue shades; the dyeings exhibited excellent light and sublimation fastness.

Following the procedure described hereinbefore and using the intermediates indicated hereinafter, the following compounds and shades on polyester are obtained.

TABLE V

| Anthraquinone intermediate | Aminophenyl-ketone | Anthraquinone product | Shade on polyester |
|---|---|---|---|
| 4,8-dinitro anthrarufin | 3-aminobenzophenone | [structure: OH O NH—C6H4—CO—C6H5; NO2 O OH] | Reddish Blue. |
| Mixture of 4,8-dinitro anthrarufin and 4,5-dinitro-chrysazin. | 4'-aminoaceto-phenone. | Mixture of: [structure: NO2 O NH—C6H4—COCH3; OH O OH] and [structure: OH O NH—C6H4—COCH3; NO2 O OH] | Blue. |

EXAMPLE 7

3.6 parts of 4,5-dinitrochrysazin, 3.6 parts of p-amino-α-hydroxyacetophenone and 54 parts of methyl cellosolve is stirred and refluxed for 18 hours. The reaction mixture is cooled to 25° C. and 50 parts of 5% hydrochloric acid solution is added during ½ hour. The slurry is stirred ½ hour, filtered and washed neutral.

When dispersed and applied to polyester fibers, by the procedures described in Example 1, a violet shade showing excellent light and sublimation fastness is obtained. This dyestuff is essentially 1,8-dihydroxy-4-nitro-5-p-(α-hydroxyacetylanilino)- anthraquinone.

EXAMPLE 8

17.9 parts of 1-hydroxy-4-m-acetylanilinoanthraquinone (Table III) and 400 parts o-dichlorobenzene are stirred and heated to 110–120° C. 8.4 parts bromine are added during 1 hour at 110–120° C. The reaction mixture is stirred 1 hour longer at 110–120° C. The solvent is removed by steam distillation and the product is recovered by filtering and washing free of acid with hot water. The product, 1 - hydroxy-4-m-(α - bromoacetylanilino)-anthraquinone, dyes polyester a violet shade with good sublimation and light fastness.

Following the procedure described hereinbefore and using the intermediates indicated hereinafter, the following compounds and shades on polyester are obtained.

TABLE VI

| Anthraquinone intermediate | Anthraquinone product | Shade on polyester |
|---|---|---|
| 1-benzamido-4-p-acetyl-anilinoanthraquinone (Table II). | [structure: anthraquinone with NH—C6H4—COCH2Br at 4-position and NH—CO—C6H5 at 1-position] | Violet. |
| 1,4-bis-p-acetyl-anilinoanthraquinone (Table II). | [structure: anthraquinone with NH—C6H4—COCH2Br at both 1- and 4-positions] | Green. |

EXAMPLE 9

5 parts of 1-benzamido-4-p-acetylanilinoanthraquinone (Table II), 500 parts 5% aqueous sodium hydroxide and 2.5 parts of an anionic surface active agent obtained from the condensation of naphthalene-sulfonic acid and formaldehyde is heated 12 hours at 200–210° C. at autogeneous pressure in a stirred autoclave. After cooling to below 50° C., the autoclave is discharged and the reaction product isolated by acidifying the resultant slurry with 55 parts of 31% hydrochoric acid, filtering and washing neutral. The product, 1-amino-4-p-acetylanilinoanthraquinone, gives a blue-green shade on polyester fibers.

Following the procedure described hereinbefore and using the intermediates indicated hereinafter, the following compounds and shades on polyester are obtained.

14.0 parts of leuco-1,4,5,8-tetrahydroxyanthraquinone and 12.0 parts 3-aminobenzophenone are added to the reaction mixture. The reaction mixture is then heated to reflux and the temperature maintained for 10 hours. The mixture is cooled to 70–80° C. and aerated for 3 hours. The mass is cooled to 25–30° C. and filtered. The product on the filter is washed 3 times with 25.0 parts of amyl alcohol. The product is steam distilled and filtered followed by drying. 1,5,8-trihydroxy-4-m-benzoylanilinoanthraquinone is obtained as a dark, blue powder in a yield of 22.0 parts. When used in dyeing, it gives blue dyeings having excellent light fastness on polyester fibers.

Following the procedure described hereinbefore and reacting leuco - 1,4,5,8-tetrahydroxyanthraquinone with

TABLE VII

| Anthraquinone intermediate | Anthraquinone product | Shade on polyester |
|---|---|---|
| 1-benzamido-5-p-acetyl-anilinoanthraquinone (Table I). | [structure] | Red. |
| 1-benzamido-8-p-acetyl-anilinoanthraquinone (Table I). | [structure] | Red. |

EXAMPLE 10

125.0 parts of amyl alcohol and 10.0 parts of anhydrous boric acid are heated together at 70–80° C. for ½ hour.

the aminophenylketones indicated hereinafter, the following compounds and shades on polyester fabrics are obtained. All of these dyeings exhibit excellent light fastness.

| Aminophenylketone | Anthraquinone product | Shade on polyester |
|---|---|---|
| 4'-aminobenzophenone | [structure 1,5,8-trihydroxy-4-(4-benzoylanilino)anthraquinone] | Blue. |
| 4'-aminopropiophenone | [structure with COCH₂CH₃] | Blue. |
| 3'-aminoacetophenone | [structure with COCH₃] | Blue. |

EXAMPLE 11

10.0 parts of the dyestuff of Example 9 are brought to a state of fine dispersion by milling in a ball mill with 3.0 parts of the condensation product of naphthalene-2-sulfonic acid with formaldehyde and 37 parts of water. Amounts of this preparation, sufficient to provide a concentration of 1.5, 3.0 and 6.0 parts of dyestuff per liter of dyebath, are finely dispersed in water containing 10.0 parts of sodium alginate per liter and the resultant pad liquor is brought to a temperature of 25° C.

Polyethylene terephthalate fabric is then padded with the above liquor and mechanicaly squeezed to a 65% pickup. The padded material is then air dried and developed by dry heat curing in an electrically heated, hot-air dryer for 1 minute at 200° C. The dyed fabric is scoured for 5 minutes at the boil in a solution containing 3% of sodium di-iso-butyl naphthalene monosulfonate and 5% sodium carbonate and then dried.

A bright blue-green dyeing is obtained characterized by excellent fastness to light and good sublimation fastness.

What is claimed is:

1. A linear polyester fiber dyed with a compound of the formula

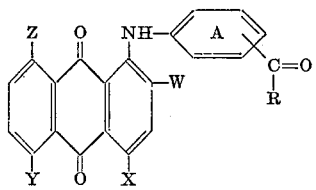

wherein R is a member selected from the group consisting of hydrogen, alkyl of 1 to 9 carbon atoms, halo-lower alkyl, hydroxy-lower alkyl, phenyl, and substituted phenyl wherein the substituent may be halo, hydroxy, lower alkyl and lower alkoxy; the phenyl ring A can be substituted by halogen, hydroxy, lower alkyl or lower alkoxy, W is a member selected from the group consisting of lower alkyl, lower alkoxy, halogen and hydrogen; X, Y and Z have the following relationships: (a) X, Y and Z are independently selected from the group consisting of hydrogen and hydroxyl, (b) one of X, Y and Z is a member selected from the group consisting of

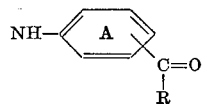

benzamido, p-toluenesulfonamido, benzenesulfonamido, hydroxy, amino and lower alkoxy and the remainder are hydrogen, (c) X is hydroxy, Y and Z are selected from the group consisting of chlorine and hydroxy, provided that when one of Y and Z is hydroxy, the other is a member selected from the group consisting of nitro, and

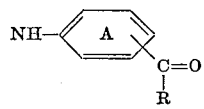

(d) X is methoxy, one of Y and Z is methoxy and the other is a member selected from the group consisting of

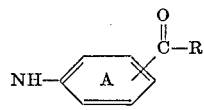

with the proviso that only one of X, Y and Z can be

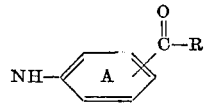

and the phenyl ring A can be substituted by a member selected from the group consisting of halogen, hydroxy, lower alkyl and lower alkoxy.

2. Linear polyester fibers according to claim 1 wherein the compound is

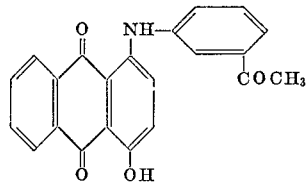

3. Linear polyester fibers according to claim 1 wherein the compound is

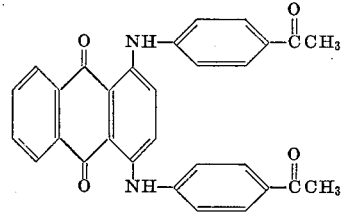

4. Linear polyester fibers according to claim 1 wherein the compound is

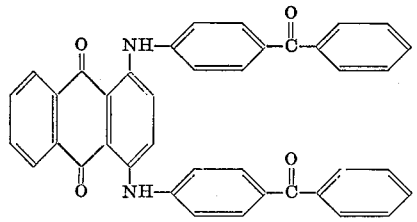

5. Linear polyester fibers according to claim 1 wherein the compound is

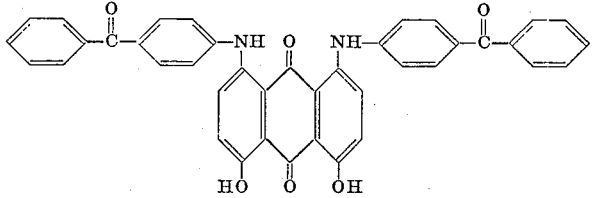

6. Linear polyester fibers according to claim 1 wherein the compound is

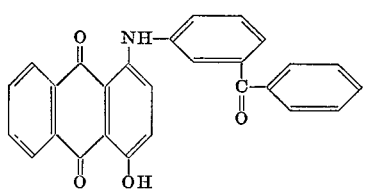

7. Linear polyester fibers according to claim 1, in which the polyester fiber is polyethylene terephthalate.

8. A process of dyeing and printing a linear polyester fiber which comprises applying to fibrous material of synthetic polyester an aqueous dispersion of a compound of claim 1.

References Cited

UNITED STATES PATENTS

| | | | |
|---|---|---|---|
| 2,335,412 | 11/1943 | Hentrich et al. | 260—372 |
| 3,232,927 | 2/1966 | Randall et al. | 260—372 X |

FOREIGN PATENTS

| | | |
|---|---|---|
| 391,930 | 9/1965 | Switzerland. |

GEORGE F. LESMES, Primary Examiner

T. J. HERBERT, Jr., Assistant Examiner

U.S. Cl. X.R.

8—176, 179; 260—272, 276